3,488,389
PERFLUOROIMIDES
William J. McKillip, Minneapolis, Minn., assignor to Ashland Oil & Refining Company, Ashland, Ky., a corporation of Kentucky
No Drawing. Filed Sept. 7, 1965, Ser. No. 485,567
Int. Cl. C07c *103/12*
U.S. Cl. 260—561          4 Claims

ABSTRACT OF THE DISCLOSURE

A class of amine perfluoroimides is provided by the reaction of a hydrazide of a perfluoro monocarboxylic acid with a quaternizing agent.

---

The present invention relates to novel amine perfluoroimides, to methods for the preparation of amine perfluoroimides and the decomposition of such perfluoroimides to perfluoroisocyanates.

The novel amine perfluoroimides have the general formula:

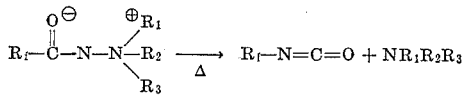

wherein $R_f$ is a perfluoroalkyl radical and $R_1$ to $R_3$ are alkyl and aryl radicals and radicals in which $R_2$ and $R_3$ can combine to form heterocyclic rings with the nitrogen. The term "aryl" as employed herein is meant to define an aromatic radical in which the unsatisfied valence is at a carbon of the aromatic ring.

The pyrolysis of the amine perfluoroimide results in the formation of an isocyanate and a tertiary amine in accordance with the following reaction:

$$R_f-\overset{O^{\ominus}}{\underset{\|}{C}}-N-\overset{\oplus}{N}\overset{R_1}{\underset{R_3}{\diagdown R_2}} \xrightarrow{\Delta} R_f-N=C=O + NR_1R_2R_3$$

The amine perfluoroimide of the present invention is prepared from the perfluoroacide hydrazide in accordance with the following reactions:

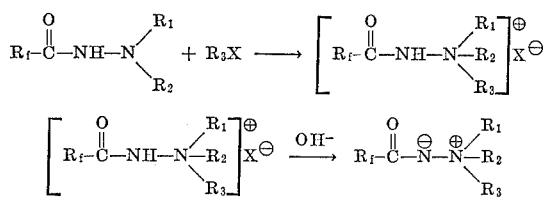

wherein $R_f$ and $R_1$ to $R_3$ have the above-indicated meaning and X is a radical capable of forming an anion and preferably is a halogen. Alternately the two reactions leading to the formation of the amine perfluoroimide can be combined by reacting the perfluoroacid hydrazide with $R_3X$ in the presence of a metal alkoxide to result directly in the formation of the amine perfluoroimide.

The reaction of the perfluoroacid hydrazide with the quaternizing agent can be conducted in the absence of a solvent, if a homogeneous liquid mixture of the reagents can be formed or in the presence of a diluent which is generally a polar solvent such as acetonitrile, isopropyl alcohol, water and dimethyl formamide. The reaction temperature can vary from room temeprature to elevated temperatures which do not cause decomposition of the reagents or products. Generally the reaction is carried out at reflux temperatures for liquid reagents and at temperatures of 60° to 300° C. for reagents which require pressurization to prevent vaporization at the reaction temperatures. Thus, atmospheric as well as superatmospheric pressures are employed depending on the reagents and reaction temperatures.

The quaternized acid hydrazide is then treated with an aqueous base such as aqueous sodium hydroxide preferably to obtain a neutral pH. The reaction mixture is evaporated and the amine perfluoroimide is extracted with a suitable solvent which does not cause appreciable solution of the byproduct of the cation of the base with the anion of the quaternary salt. Extraction as well as other means can be employed to purify the amine perfluoroimide.

The acid hydrazide employed to prepare the amine perfluoroimide is obtained by reaction of a perfluoroacid chloride, perfluoroacid anhydride or an alkyl perfluoroacid ester with an unsymmetrical hydrazine. The reaction of the perfluoroacid chloride with the unsymmetrical hydrazine is exothermic in nature and is, therefore, preferably carried out in the presence of a diluent and with the use of reaction cooling means. Suitable diluents include hydrocarbons, esters, and ethers. The reaction temperature is generally maintained below about 15° C. at least during the initial mixing of the reagents. An excess of the hydrazine is employed.

The preferred perfluoroacid chlorides employed to form the acid hydrazides have the general formula:

$$C_nF_{2n+1}COCl$$

wherein $n$ is from 1 to 12. Although higher perfluoroacid chlorides are operative, they are not readily available and hence not normally employed. Examples of perfluoroacid chlorides include the chlorides of perfluoroacetic acid, perfluoropropionic acid, perfluorobutyric acid, perfluoroisobutyric acid, perfluorohexanoic acid, perfluorooctanoic acid, and perfluorododecanoic acid.

The unsymmetrical hydrazine employed in combination with the perfluoroacid chloride to form the acid hydrazide, which in turn is reacted to form amine perfluoroimide, has the general formula:

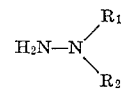

wherein $R_1$ and $R_2$ have the above-indicated meaning. Preferably $R_1$ and $R_2$ are lower alkyl groups, phenyl and substituted-phenyl groups and radicals forming heterocyclic ring compounds with the nitrogen such as pyrrolidine, pyrrole, pyrroline, and piperidine. Specific examples of the unsymmetrical hydrazines employed to form the perfluoroacid hydrazides include dimethyl hydrazine, diethyl hydrazine, methyl-ethyl hydrazine, dibutyl hydrazine, N-aminopyrrolidine, N-amino-2-methylpyrrolidine, N-amino-2-phenylpyrrolidine, N-aminopyrrole, N-amino-2,5-dimethylpyrrole, N-aminopyrroline, N-amino-2-phenylpyrroline, diphenyl hydrazine, dicresyl hydrazine, di-p-nitrophenyl hydrazine, and methyl phenyl hydrazine.

The quaternizing agent employed in the formation of the quaternary salt has the general formula:

$$R_3X$$

wherein $R_3$ is as above-indicated, and preferably is a lower alkyl radical or a phenyl alkyl radical. Where $R_3$ is benzylic or allylic, $R_f$ should preferably have a greater migratory aptitude than $R_3$. Otherwise, the benzylic or allylic group may preferentially rearrange to the electron-rich nitrogen, thus giving other than the desired products. The term "migratory aptitude" means that property of an organic radical which determines its capacity to redistribute itself, e.g. migrate from an electron-deficient to an electron-rich nitrogen atom. X can be any quaternizing anion but is preferably a halogen such as chlorine, bromine, or iodine. Non-halogen radicals capable of forming the anion of the quaternary salt include methyl sulfate, ethyl sulfate, toluene sulfonate, methyl benzene sulfonate, and similar monovalent acid radicals. Suitable quaternizing agents include methyl chloride, ethyl iodide, benzyl chloride, methyl toluene sulfonate, and methyl benzene sulfonate.

The novel amine perfluoroimides which are obtained by the above-described reagents and reactions include trimethylamine perfluoroacetimide, tributylamine perfluoroacetimide, triphenylamine perfluoroacetimide, dimethylphenylamine perfluoroacetimide, N-methylpyrrolidine perfluoroacetimide, N-ethyl-2-methylpyrrolidine perfluoroacetimide, N-phenylpyrrole perfluoroacetimide, N-methylpyrroline perfluoroacetimide, trimethylamine perfluoropropionimide, triphenylamine perfluorobutyrimide, trimethylamine perfluorohexanimide, trimethylamine perfluoro-2,4-dimethylheptanimide, and trimethylamine perfluorododecanimide.

The amine perfluoroimides of the present invention are principally employed in the formation of perfluoroisocyanates. The decomposition of the perfluoroimides occurs at temperatures above about 100° C. The resulting perfluoroisocyanates are useful for chemical modification of hydroxyl group containing compounds with which they readily react. In particular they can be employed to stabilize hydroxyl terminated polymers. Perfluoroisocyanates and their uses are known in the art.

The formation of the amine perfluoroimide is further illustrated by the following example, in which all parts are by weight unless otherwise stated.

EXAMPLE

Into a round bottom flask equipped with a mechanical stirrer and addition funnel is charged 26.3 parts of 1,1-dimethylhydrazine and 400 parts of hexane. The solution is externally cooled to maintain a temperature of about −80° C. and 23.6 parts of perfluoroacetyl chloride gas is bubbled into the flask with agitation over a period of one hour. After addition of the perfluoroacetyl chloride, the solution is stirred for an additional 12 to 16 hours at room temperature. The resulting reaction mixture is evaporated to dryness and the product, perfluoroacetyl hydrazide, M.P. 86–89, is sublimed from the reaction mixture.

A mixture of 2.0 parts of N,N-dimethylperfluoroacetyl hydrazine and 3.6 parts of methyl p-toluene sulfonate in 15 parts of dimethyl formamide is refluxed for 3 days. The product is collected by filtration from the cooled reaction mixture, extracted and recrystallized from methanol. 1,1,1-trimethyl-2-perfluoroacetyl-hydrazonium p-toluene sulfonate is obtained.

The quaternary salt, 4.4 parts, is dissolved in a solvent consisting of 10% ether, 90% (by volume) benzene and chromatographed on neutral alumina. Evaporation of the element gave 1.04 g. of product.

On heating the acetimide to decomposition temperature of about 275° C. trimethylamine and perfluoromethylisocyanate is obtained.

The foregoing example has illustrated the preparation of the perfluoroimides of the present invention. It will be apparent that the method illustrated is equally applicable to perfluoroacid hydrazides prepared from other perfluoroacid chlorides and that other quaternizing agents included within the scope of the invention can be employed. Other methods of preparing the perfluoroacid hydrazide will be apparent to those skilled in the art.

What is claimed is:
1. Amine perfluoroimide having the formula:

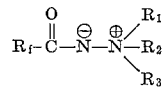

wherein $R_f$ is a perfluoroalkyl radical and $R_1$, $R_2$ and $R_3$, when taken singly represent a radical selected from the group consisting of alkyl and phenyl and in which $R_2$ and $R_3$, when taken collectively with the nitrogen atom to which they are attached, represent a heterocyclic ring selected from the group consisting of pyrrolidine, pyrrole, pyrroline and piperidine.

2. The perfluoroimide of claim 1 wherein $R_1$ to $R_3$ are alkyl groups.

3. The perfluoroimide of claim 1 wherein $R_1$ to $R_3$ are methyl.

4. Trimethylamine perfluoracetimide.

References Cited

Wawzonek et al.: J. Am. Chem Soc. (1960), vol. 80, pp. 5718–21.

ALEX MAZEL, Primary Examiner

J. A. NARCAVAGE, Assistant Examiner

U.S. Cl. X.R.
260—294, 326.3, 562, 453